(12) United States Patent
Siahaan et al.

(10) Patent No.: US 11,518,138 B2
(45) Date of Patent: Dec. 6, 2022

(54) USING WOVEN FIBERS TO INCREASE TENSILE STRENGTH AND FOR SECURING ATTACHMENT MECHANISMS

(71) Applicant: Apple Inc., Cupertino, CA (US)

(72) Inventors: Edward Siahaan, Cupertino, CA (US); Douglas J. Weber, Cupertino, CA (US); Hsiang Hung Chen, Shenzhen (CN); Naoto Matsuyuki, Tokyo-to (JP); Yoji Hamada, Tokyo-to (JP); Teodor Dabov, Cupertino, CA (US); Whitney D. Mattson, Cupertino, CA (US); Ying-Liang Su, Shenzhen (CN)

(73) Assignee: Apple Inc., Cupertino, CA (US)

( * ) Notice: Subject to any disclaimer, the term of this patent is extended or adjusted under 35 U.S.C. 154(b) by 797 days.

(21) Appl. No.: 14/578,319

(22) Filed: Dec. 19, 2014

(65) Prior Publication Data

US 2015/0174854 A1 Jun. 25, 2015

Related U.S. Application Data

(60) Provisional application No. 61/919,508, filed on Dec. 20, 2013, provisional application No. 61/919,528, filed on Dec. 20, 2013.

(51) Int. Cl.
*B32B 5/02* (2006.01)
*B32B 7/02* (2019.01)
(Continued)

(52) U.S. Cl.
CPC ............ *B32B 5/024* (2013.01); *B32B 3/04* (2013.01); *B32B 3/266* (2013.01); *B32B 5/26* (2013.01);
(Continued)

(58) Field of Classification Search
CPC ... B29L 2031/7282; B32B 5/024; B32B 5/26; B32B 3/04; B32B 3/266; B32B 7/02;
(Continued)

(56) References Cited

U.S. PATENT DOCUMENTS

| 1,775,813 A | 9/1930 | Colby |
| 1,957,156 A | 5/1934 | Barth et al. |

(Continued)

FOREIGN PATENT DOCUMENTS

| CN | 1163640 | 10/1997 |
| CN | 1210567 | 3/1999 |

(Continued)

OTHER PUBLICATIONS

"Great Eastern Naruto Leaf Village Logo Headband," Manufactured by Great Eastern, Retrieved from Amazon.com on Nov. 11, 2016, available to the public at least of Sep. 22, 2006.*

(Continued)

*Primary Examiner* — Maria V Ewald
*Assistant Examiner* — Ethan Weydemeyer
(74) *Attorney, Agent, or Firm* — BakerHostetler

(57) ABSTRACT

Embodiments disclosed are directed to a woven fabric band that is capable of being secured to another object using threads or the band itself. The woven fabric band may include an inner layer having a first temperature melting point and an outer layer having a second temperature melting point that is higher than the first temperature melting point. When heat having the first temperature is applied to the woven fabric band, the inner layer of the woven fabric band melts while the outer layer remains in its original state. When the inner layer melts, the inner layer conforms to a first shape. As a result of the inner layer conforming to the first shape, the outer layer also conforms to the same shape.

14 Claims, 10 Drawing Sheets

(51) Int. Cl.
  *B29C 65/02* (2006.01)
  *B32B 5/26* (2006.01)
  *B32B 3/26* (2006.01)
  *B32B 3/04* (2006.01)
  *B32B 7/027* (2019.01)
  *B29L 31/00* (2006.01)
  *B32B 7/023* (2019.01)

(52) U.S. Cl.
  CPC ....... *B32B 7/027* (2019.01); *B29L 2031/7282* (2013.01); *B32B 7/023* (2019.01); *B32B 2250/02* (2013.01); *B32B 2250/20* (2013.01); *B32B 2307/54* (2013.01); *B32B 2457/00* (2013.01); *Y10T 428/24942* (2015.01)

(58) Field of Classification Search
  CPC ......... B32B 2307/54; Y10T 428/24942; A44B 17/0011; A44B 17/0017; F16B 2/12; F16B 2/14; A44C 5/14; A44C 5/2071
  USPC ...... 52/404.1–404.5; 156/169–172; 428/188; 442/239–267; 224/164–179; 24/647–650, 664–676
  See application file for complete search history.

(56) References Cited

U.S. PATENT DOCUMENTS

| | | |
|---|---|---|
| 2,050,901 A | 8/1936 | Sundell |
| 2,638,523 A | 5/1953 | Rubin |
| 2,834,158 A | 5/1958 | Petermann |
| 2,990,616 A | 7/1961 | Kuris et al. |
| 3,131,515 A | 5/1964 | Mason |
| 3,535,955 A | 10/1970 | Stanley et al. |
| 3,802,040 A | 4/1974 | Nomamoto |
| 3,814,016 A | 6/1974 | Leach et al. |
| 3,957,715 A | 5/1976 | Lirones et al. |
| 4,343,846 A | 8/1982 | Kohn |
| 4,353,763 A | 10/1982 | Simons |
| 4,439,298 A | 3/1984 | Ford et al. |
| 4,467,168 A | 8/1984 | Morgan et al. |
| 4,622,091 A | 11/1986 | Letterman |
| 4,716,072 A | 12/1987 | Kim |
| 4,849,145 A | 7/1989 | Hirsch et al. |
| 4,934,103 A | 6/1990 | Campergue et al. |
| 4,988,550 A | 1/1991 | Keyser et al. |
| 5,009,821 A | 4/1991 | Weaver |
| 5,052,153 A | 10/1991 | Wiand |
| 5,064,707 A | 11/1991 | Weaver et al. |
| 5,101,599 A | 4/1992 | Takabayasi et al. |
| 5,111,579 A | 5/1992 | Andersent |
| 5,116,138 A | 5/1992 | Macsenti et al. |
| 5,140,773 A | 8/1992 | Miwa et al. |
| 5,213,881 A | 5/1993 | Timmons et al. |
| 5,237,788 A | 8/1993 | Sandow |
| 5,249,534 A | 10/1993 | Sacks |
| 5,264,992 A | 11/1993 | Hogdahl et al. |
| 5,395,682 A | 3/1995 | Holland et al. |
| 5,416,953 A | 5/1995 | Hui |
| 5,439,330 A | 8/1995 | Bayer et al. |
| 5,500,164 A | 3/1996 | Livesay et al. |
| 5,503,506 A | 4/1996 | Yuan |
| 5,556,670 A | 9/1996 | Mihara et al. |
| 5,617,377 A | 4/1997 | Perret, Jr. |
| 5,619,889 A | 4/1997 | Jones et al. |
| 5,755,539 A | 5/1998 | Takeuchi et al. |
| 5,865,569 A | 2/1999 | Holstein et al. |
| 5,879,492 A | 3/1999 | Reis et al. |
| 5,906,873 A | 5/1999 | Kim et al. |
| 5,967,357 A | 10/1999 | Kellogg et al. |
| 5,984,600 A | 11/1999 | Gierth |
| 6,117,517 A | 9/2000 | Diaz et al. |
| 6,117,546 A | 9/2000 | Geiman et al. |
| 6,179,943 B1 | 1/2001 | Welch et al. |
| 6,193,089 B1 | 2/2001 | Yu |
| 6,267,036 B1 | 7/2001 | Lani |
| 6,276,100 B1 | 8/2001 | Woll et al. |
| 6,299,246 B1 | 10/2001 | Tomka |
| 6,435,363 B2 | 8/2002 | Fingerhut et al. |
| 6,437,238 B1 | 8/2002 | Annerino et al. |
| 6,464,195 B1 | 10/2002 | Hildebrandt et al. |
| 6,689,246 B2 | 2/2004 | Hirahara et al. |
| 6,703,519 B1 | 3/2004 | Buvat et al. |
| 6,775,908 B2 | 8/2004 | Chara et al. |
| 6,846,221 B2 | 1/2005 | Ulrich et al. |
| 6,871,527 B2 | 3/2005 | Hansma et al. |
| 6,962,312 B2 | 11/2005 | Shih |
| 6,973,815 B2 | 12/2005 | Bryans et al. |
| 7,029,267 B2 | 4/2006 | Caron et al. |
| 7,063,763 B2 | 6/2006 | Chapman, Jr. |
| 7,068,343 B2 | 6/2006 | Saitoh |
| 7,097,371 B2 | 8/2006 | Hasunuma et al. |
| 7,115,323 B2 | 10/2006 | Westre et al. |
| 7,191,555 B2 | 3/2007 | Hughes |
| 7,238,089 B2 | 7/2007 | Tsumuraya et al. |
| 7,326,012 B2 | 2/2008 | Schlotter |
| 7,338,235 B2 | 3/2008 | Weghaus et al. |
| 7,354,350 B2 | 4/2008 | Glimpel |
| 7,393,577 B2 | 7/2008 | Day et al. |
| 7,436,653 B2 | 10/2008 | Yang et al. |
| 7,503,368 B2 | 3/2009 | Chapman et al. |
| 7,527,321 B1 | 5/2009 | Benderoth et al. |
| 7,534,501 B2 | 5/2009 | Durney |
| 7,545,628 B2 | 6/2009 | Takuma |
| 7,560,152 B2 | 7/2009 | Rajabali et al. |
| 7,571,828 B2 | 8/2009 | Palley et al. |
| 7,588,970 B2 | 9/2009 | Ohnuma |
| 7,608,314 B2 | 10/2009 | Plant |
| 7,628,879 B2 | 12/2009 | Ackerman |
| 7,669,799 B2 | 3/2010 | Elzey et al. |
| 7,710,728 B2 | 5/2010 | Arisaka et al. |
| 7,735,644 B2 | 6/2010 | Sirichai et al. |
| 7,762,028 B2 | 7/2010 | Valentz et al. |
| 7,790,637 B2 | 9/2010 | DiFonzo et al. |
| 7,934,676 B2 | 5/2011 | Dufresne et al. |
| 7,963,483 B2 | 6/2011 | Roming et al. |
| 7,971,400 B2 | 7/2011 | Boldt et al. |
| 7,988,532 B2 | 8/2011 | Choo et al. |
| 8,021,752 B2 | 9/2011 | Honma et al. |
| 8,023,260 B2 | 9/2011 | Filson et al. |
| 8,031,186 B2 | 10/2011 | Ostergaard |
| 8,042,770 B2 | 10/2011 | Martin et al. |
| 8,096,859 B2 | 1/2012 | Schimweg |
| 8,252,133 B2 | 8/2012 | Feng et al. |
| 8,317,257 B2 | 11/2012 | Rolfe et al. |
| 8,324,515 B2 | 12/2012 | Stevenson et al. |
| 8,325,094 B2 | 12/2012 | Ayala Vasquez et al. |
| 8,372,495 B2 | 2/2013 | Kenney |
| 8,408,972 B2 | 4/2013 | Kenney |
| 8,419,883 B2 | 4/2013 | Day et al. |
| 8,511,498 B2 | 8/2013 | Kenney |
| 8,562,886 B2 | 10/2013 | DiFonzo |
| 8,691,037 B2 | 4/2014 | Ingram et al. |
| 8,776,358 B2 | 7/2014 | Gotham et al. |
| 8,857,128 B2 | 10/2014 | Kenney |
| 8,963,782 B2 | 2/2015 | Ayala Vasquez et al. |
| 2002/0195742 A1 | 12/2002 | Beck et al. |
| 2003/0078070 A1 | 4/2003 | Hsu |
| 2005/0097717 A1 | 5/2005 | Rasmussen |
| 2005/0142369 A1 | 6/2005 | Canady et al. |
| 2006/0144881 A1* | 7/2006 | Bonadei .................. A44B 11/24 224/164 |
| 2007/0134466 A1 | 6/2007 | Rajaram et al. |
| 2008/0090477 A1 | 4/2008 | Balthes et al. |
| 2008/0094372 A1 | 4/2008 | Philipp |
| 2008/0169380 A1 | 7/2008 | Jackson et al. |
| 2009/0041984 A1 | 2/2009 | Mayers et al. |
| 2009/0142157 A1 | 6/2009 | Wang et al. |
| 2009/0208721 A1 | 8/2009 | Tsuchiya et al. |
| 2009/0265971 A1* | 10/2009 | Cook ..................... G09F 3/005 40/633 |
| 2009/0267266 A1 | 10/2009 | Lee et al. |
| 2010/0183836 A1* | 7/2010 | Wangenheim ............ B32B 5/08 428/36.1 |

(56) References Cited

U.S. PATENT DOCUMENTS

| | | | |
|---|---|---|---|
| 2010/0233424 A1 | 9/2010 | Dan-Jumbo et al. | |
| 2010/0315299 A1 | 12/2010 | Bibl | |
| 2010/0317248 A1* | 12/2010 | Chang | D03D 15/00 442/200 |
| 2012/0003454 A1 | 1/2012 | Younes | |
| 2012/0021196 A1 | 1/2012 | Kenney | |
| 2012/0147592 A1 | 6/2012 | Takase | |
| 2012/0222985 A1 | 9/2012 | Kenney et al. | |
| 2013/0148288 A1 | 6/2013 | Kenney | |
| 2013/0273295 A1 | 10/2013 | Kenney et al. | |
| 2014/0083133 A1* | 3/2014 | Lee | A44C 5/14 63/3.1 |

FOREIGN PATENT DOCUMENTS

| | | |
|---|---|---|
| CN | 2841707 | 11/2006 |
| CN | 1989281 | 6/2007 |
| CN | 101092944 | 12/2007 |
| CN | 101200828 | 6/2008 |
| CN | 101720276 A | 6/2010 |
| CN | 102471944 | 5/2012 |
| CN | 204608330 | 9/2015 |
| DE | 10123400 | 2/2002 |
| EP | 0516560 | 12/1992 |
| EP | 1139638 | 10/2001 |
| EP | 2047983 | 4/2009 |
| EP | 2051572 | 4/2009 |
| JP | 03269187 | 11/1991 |
| JP | 2006123475 | 5/2006 |
| JP | 2007076202 | 3/2007 |
| JP | 2007186228 | 7/2007 |
| JP | 2009000843 | 1/2009 |
| JP | 2009030195 | 2/2009 |
| JP | 2010115732 | 5/2010 |
| TW | 503940 | 9/2002 |
| WO | WO98/15404 | 4/1998 |
| WO | WO2008/133748 | 11/2008 |
| WO | WO2009/017571 | 5/2009 |

OTHER PUBLICATIONS

Rouette, Hans-Carl. "Encyclopedia of Textile Finishing—Polyester fibres," Woodhead Publishing, pp. 64-125.*

Cafe, Tony. "Physical Constants for Investigators (Reproduced from "Firepoint" Magazine)," Jun. 17, 2007, T.C. Forensic, pp. 1-7 (Year: 2007).*

Author Unknown, "3M Microspheres Innovative Solutions for Demanding Applications," 3M Innovations, 6 pages, 2004.

\* cited by examiner

USING WOVEN FIBERS TO INCREASE TENSILE STRENGTH AND FOR SECURING ATTACHMENT MECHANISMS

CROSS-REFERENCE TO RELATED APPLICATIONS

This application is a nonprovisional patent application of and claims the benefit to U.S. Provisional Patent Application No. 61/919,508, filed Dec. 20, 2013 and titled "Securing Woven Fibers to Attachment Mechanisms" and to U.S. Provisional Patent Application No. 61/919,528 filed Dec. 20, 2013 and titled "Using Woven Fibers to Increase Tensile Strength and Minimize Space," the disclosures of which are hereby incorporated herein by reference in their entireties.

TECHNICAL FIELD

The present disclosure is directed to securing woven fibers to an attachment mechanism or an attachment system and further, using woven fibers to increase tensile strength and minimize space. In some embodiments, the woven fibers may be attached to the attachment mechanism or the attachment system in a manner that increases tensile strength and minimizes space. Specifically, the present disclosure is directed to a method and system for enabling a woven fiber, or other such material, to be formed in such a way as to enable the woven fiber to securely attach to one or more attachment mechanisms while enabling the woven fiber to keep its original or intended shape and structure. In other embodiments, the woven fiber may be secured to an object using a plurality of threads of the woven fiber.

BACKGROUND

Typically, when securing a woven fabric or other material to another object, the woven fabric needs a termination point. The termination point may be made by stitching a first portion of the woven fabric to itself, a second portion of the woven fabric or to another object. However, such configurations may cause the woven fabric to change its shape, width or structure or the additional stitching may cause the width of the object and/or the woven fabric to increase. This increase in width may not be desirable. Additionally, the stitching may cause undesirable aesthetics on the woven fabric or undesirable aesthetics on the object.

It is with respect to these and other general considerations that embodiments have been made. Also, although relatively specific problems have been discussed, it should be understood that the embodiments should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

One or more embodiments of the present disclosure provide a woven fabric band that is capable of being secured to another object. In certain embodiments, the woven fabric band comprises an inner layer having a first temperature melting point and an outer layer having a second temperature melting point that is higher than the first temperature melting point. When heat, having the first temperature, is applied to the woven fabric band, the inner layer of the woven fabric band melts or becomes more malleable while the outer layer remains in its original state. When the inner layer melts, the inner layer conforms to a first shape. As a result of the inner layer conforming to the first shape, the outer layer also conforms to the same shape.

In another embodiment, a method for generating a woven fabric band is disclosed. According to such embodiments, the method includes creating an inner layer of the woven fabric band with the inner layer having a first temperature melting point. In certain embodiments, a sheath surrounds the inner layer. Further, the sheath has a second temperature melting point that is different from the temperature melting point of the inner layer. The method further includes applying heat to the woven fabric band that causes the inner layer to melt and conform to a shape without melting or damaging the sheath.

In still yet other embodiments, a method of generating a securement mechanism for a woven fabric band is disclosed. According to this method, the woven fabric band is placed into a mold. Heat is applied to a first side and a second side of a first portion of the woven fabric band. However, heat is not applied to a first side and a second side of a second portion of the woven fabric band. The heat that is applied to the first side and the second side of the first portion of the woven fabric band causes the first portion of the woven fabric band to melt. As the first portion melts, the first portion conforms to the shape of the mold and may generate the securement mechanism. A channel in the mold causes the melted first portion of the woven fabric band to flow away from the second portion of the woven fabric band. As a result, the melted first portion of the woven fabric band may be easily removed from the second portion of the woven fabric band.

In still yet other embodiments, a method and system for securing an object to a woven fabric band is disclosed. As part of this process, the woven fabric band may be cut, scarred, or manufactured so as to expose a plurality of threads from a portion of the woven fabric band. An object that is to be secured to the woven fabric band is then aligned with the woven fabric band or to the plurality of threads. The object is then secured to the woven fabric band using the plurality of threads. In certain embodiments, the plurality threads are wrapped around or stitched to the object. Once the plurality of threads have been wrapped around or stitched to the object, the plurality of threads are exposed to a heating process. The heating process may be performed with one or more heat sources. The heat source causes the plurality of threads to melt. The melting process, and the subsequent cooling process, causes the plurality of threads to become more rigid which increases the tensile strength of the plurality of threads. Further, the melting process causes the plurality of threads to decrease in size. Due to the decrease in size, the threads may then be hidden from view by coupling a second object to the object that is secured to the woven fabric band.

Also disclosed is a woven fabric band comprising an inner layer having a first temperature melting point and an outer layer having a second temperature melting point that is higher than the first temperature melting point. In certain embodiments, the inner layer has a plurality of threads extending therefrom. The plurality of threads are used to stitch an assembly to the woven fabric band. Further, the plurality of threads increase in tensile strength and decrease in width when heat having the first temperature melting point is applied to the plurality of threads.

In yet another embodiment, a method for creating a woven fabric band for securement to an object is disclosed. According to one or more embodiments, an inner layer having a first temperature melting point is created. The inner layer is then surrounded with a sheath. In certain embodiments, the sheath has a second temperature melting point that is different from the first temperature melting point. The method also includes exposing, on a distal end of the woven fabric band, a plurality of threads. The plurality of threads are used to stitch the object to the distal end of the woven fabric band. Once the object has been stitched to the distal end of the woven fabric band, the plurality of threads are exposed to a heat source.

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. The following detailed description is, therefore, not to be taken in a limiting sense.

The various embodiments described herein are directed to using a fabric material, or threads of the fabric material, to secure various objects to a band or a strap or other such mechanism. In some embodiments described herein, the fabric material may have an inner layer and an outer layer. The inner layer may have a first temperature melting point while the outer layer has a second temperature melting point. Thus, as the inner layer is heated and subsequently deforms due to the heating process, the outer layer may conform to the shape of the inner layer. However, because the outer layer has a higher temperature melting point, the heating process may not affect the aesthetics of the outer layer.

As discussed above, in some embodiments, threads of the band or strap may be used to secure an attachment mechanism or other object to the band or strap. The threads may be used to stitch the attachment mechanism to the band or strap. The threads may then be heated or otherwise melted. The heating process and subsequent cooling process may increase the tensile strength of the threads and also decrease a width, a circumference or other measurement of the threads.

Figure 1A:
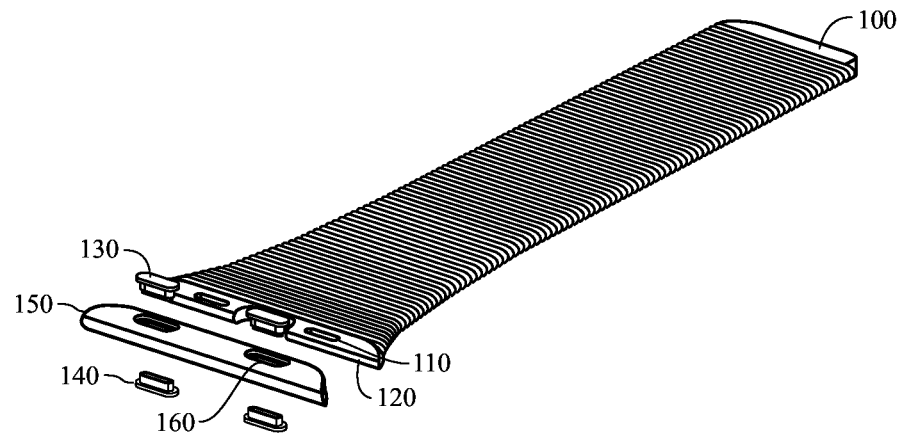
FIG. 1A illustrates an exemplary woven fabric band having a plurality of securement features according to one or more embodiments of the present disclosure.

Turning to the figures, FIG. 1A illustrates an exemplary woven fabric band 100 having a plurality of securement features according to one or more embodiments of the present disclosure. Although the term fabric is used herein, it is contemplated that the embodiments and methods described herein may be applied to various materials that can be woven together. It is also contemplated that the material, when woven together, may be cut, manufactured or manipulated into various shapes, articles and objects having varying dimensions. Non-limiting examples of the fabric may include nylon and other such polymers.

The woven fabric, or portions of the woven fabric, may be heated to a melting point (e.g., a point at which the heated portion melts). When the woven fabric is melted, the melted portion may be manipulated or formed into various shapes, protrusions, depressions, graphics and the like. However, due to the nature of the construction of the woven material, (e.g., an outer layer of the woven fabric being more heat resistant than an inner layer of the woven fabric) the outer layer conforms to the shape of the inner layer while still maintaining its aesthetic properties (e.g., color, texture etc.).

As shown in FIG. 1A, the woven fabric band 100 may be a thin band that may be secured to another object. In some embodiments, the object may be a mobile phone, a device that tells time, a health monitoring device or assistant, a purse, bracelet or other article of clothing. Although a flat thin band is specifically shown and described herein, the woven fabric band 100 may be made in any shape. For example, if the woven fabric band 100 was to be attached to a purse, the woven fabric band may be circular in shape.

In certain embodiments, the woven fabric band 100 may have one or more through holes 110 or apertures that may be used to secure the woven fabric band 100 to another object. As shown in FIG. 1A, the through holes 110 may be formed directly in the woven fabric band 100. The through holes 110 may be formed using a method such as method 400 described herein with respect to FIG. 4.

In certain embodiments, the through holes 110 may be formed on a distal end 120 of the woven fabric band 100.

Although the through holes 110 are shown on the distal end 120 of the woven fabric band 100, the through holes 110, and associated securement features, may be disposed on multiple sides and/or ends of the woven fabric band 100.

Figure 1B:
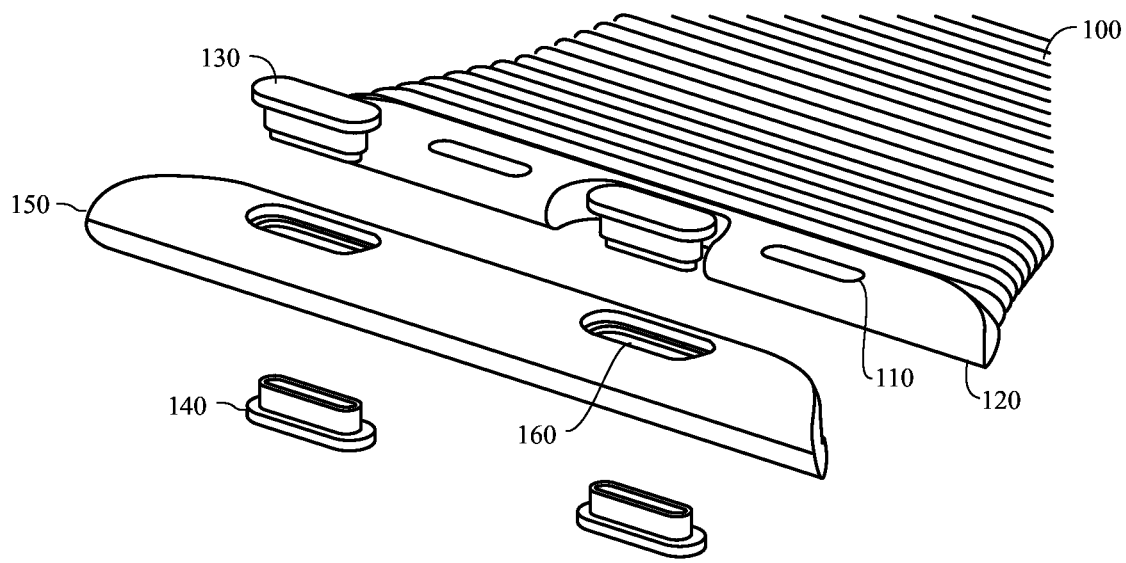
FIG. 1B illustrates a close-up view of the woven fabric band of FIG. 1A having the plurality of securement features according to one or more embodiments of the present disclosure.

As shown in FIG. 1A and FIG. 1B, the distal end 120 of the woven fabric band 100 may have a smooth surface. In embodiments, the heating and melting processes described herein may cause a portion of the woven fabric band 100 to change its structure and appearance. However, because the distal end 120 of the woven fabric band 100 is smooth, the distal end 120 of the woven fabric band 100 may be moveably coupled to another object, such as, for example, object 150. In another embodiment, the distal end 120 of the woven fabric band 100 may be configured to pivot within an object 150. As such, it may be desirable that the distal end 120 of the woven fabric band 100 has a smooth surface. Although a smooth surface is specifically mentioned and shown, the distal end 120 of the woven fabric band 100 may have other textures (e.g., rough, slatted, etc.) as well as various shapes, sizes and dimensions.

As briefly discussed above, although the through holes 110 are shown on the distal end 120 of the woven fabric band 100, the through holes 110 may be formed on a proximal end of the woven fabric band 100. In addition, one or more through holes 110 may be formed on other portions of the woven fabric band 100, such as, for example, in a middle or center portion of the woven fabric band 100. The through holes 110 may be configured in a variety of shapes, such as, for example, circular, triangular, rectangular, square, and the like. In some embodiments, the through holes 110 at a first location on the woven fabric band 100 may have a first shape, size or dimension while one or more through holes 110 at a second location on the woven fabric band 100 have a second, different shape, size or dimension.

In certain embodiments, the through holes 110 may be configured to receive one or more interlock mechanisms. As shown in FIG. 1A and FIG. 1B, the interlock mechanisms may include a top portion 130 and a bottom portion 140. In embodiments, the top portion 130 may be received by the bottom portion 140. Alternatively, the top portion 130 may be configured to receive the bottom portion 140. Further, the top portion 130 and the bottom portion 140 may be configured to secure an object, such as object 150, to the woven fabric band 100 using object through holes 160 that align with through holes 110 of the woven fabric band 100. When the object through holes 160 are aligned with the through holes 110, the top portion 130 and the bottom portion 140 of the interlock mechanisms may be used to secure the object 150 to the woven fabric band 100.

Although a top portion 130 and a bottom portion 140 are specifically disclosed, the object 150 may be secured to the woven fabric band using other attachment means, mechanisms and so on. For example, the object 150 may be secured to the woven fabric band 100 using various threads of the woven fabric band such as will be described below.

Figure 2:
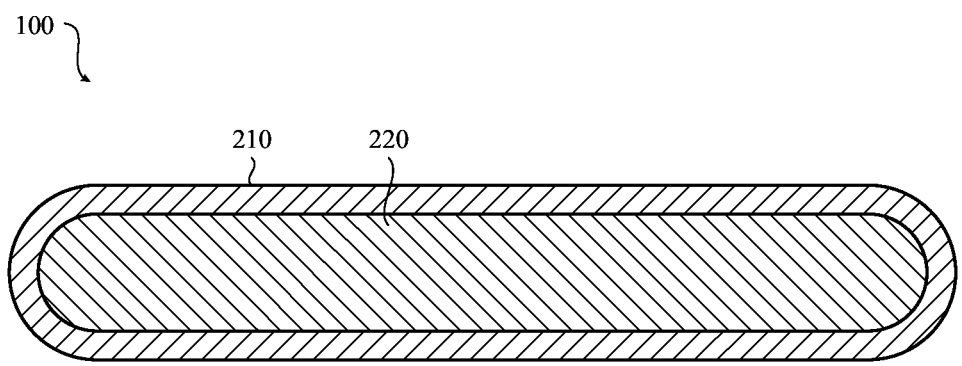
FIG. 2 illustrates a cross-sectional view of a woven fabric band according to one or more embodiments of the present disclosure.

FIG. 2 illustrates a cross-sectional view of a woven fabric band 100 according to one or more embodiments of the present disclosure. As shown in FIG. 2, the woven fabric band 100 includes an outer layer 210 and an inner layer 220. In certain embodiments, the outer layer 210 may be a first type of material (woven or otherwise) and the inner layer 220 may be a second type of material (woven or otherwise). In other embodiments, the outer layer 210 and the inner layer 220 may be the same type of material but have different temperature melting points. For example, the temperature melting point of the outer layer 210 may be 220 degrees Celsius while the temperature melting point of the inner layer 220 may be 110 degrees Celsius. In still yet other embodiments, the outer layer 210 may be made of a first material and have a first temperature melting point (e.g., 220 degrees Celsius) and the inner layer 220 may be made of a second material and have a second temperature melting point (e.g., 110 degrees Celsius).

In certain embodiments, the outer layer 210 may be a sheath that has a cross-hatch configuration. In such embodiments, the inner layer 220 may be comprised of another material or fiber. As shown in FIG. 2, the outer layer 210 may surround the inner layer 220. It is also contemplated that the outer layer 210 may be configured to removably slide over or otherwise be coupled to the inner layer 220 prior to applying heat to the woven fabric band 100.

As discussed above, the inner layer 220 may have a lower temperature melting point than the outer layer 210. As a result, when heat is applied to the woven fabric band 100, the inner layer 220 may melt or become more malleable. As such, the inner layer 220 may be manipulated (e.g., using a mold or other such form factor mechanism) to take a desired form or shape. As the inner layer 220 melts and is manipulated into a new shape, the outer layer 210 may conform to the new shape of the inner layer 220. However, because the outer layer 210 has a higher temperature melting point when compared to the inner layer 220, the outer layer 210 does not melt. As such, the outer layer 210 may retain its original aesthetic look, feel and texture (i.e., the outer layer 210 is not damaged or noticeably changed due to the melting process of the inner layer 220).

The process described above enables the inner layer 220 to take a variety of shapes and forms including, but not limited to three-dimensional shapes, logos, holes, depressions, protrusions, nubs, ridges, links, bosses and the like. As the inner layer 220 takes these various forms, the outer layer 210 conforms to the new shape of the inner layer 220. In some embodiments, the outer layer 210 is flexible but durable. As such, the outer layer 210 may maintain its original aesthetic values. For example, different colors and color combinations could be used for the outer layer 210 and the inner layer 220. Further, the inner layer 220 and/or the outer layer 210 may be transparent or translucent to create different cosmetic effects.

In some embodiments, a first portion of the woven fabric band 100 may be subjected to a heating process while a second, different portion of the woven fabric band 100 is not subjected to the heating process. For example, one or more "links" could be created on the woven fabric band 100 by melting different portions of the woven fabric band 100 at various intervals. In such embodiments, the melted portions may become semi-rigid when subsequently cooled, while the un-melted portions of the woven fabric band 100 are flexible. The woven fabric band 100, or one or more of the inner layer 220 and the outer layer 210, have different thicknesses. Based on the thickness of the outer layer 210 and the inner layer 220, different cosmetic effects may be created.

Figure 3:
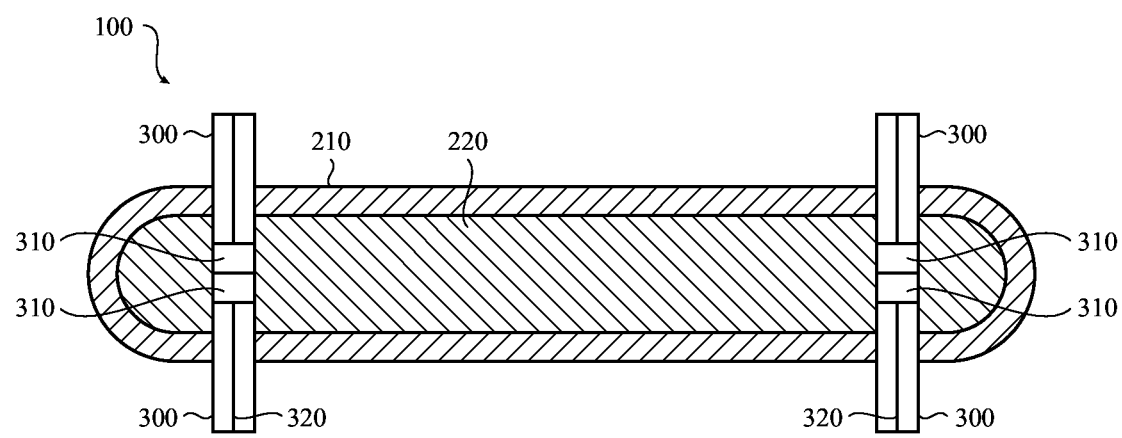
FIG. 3 illustrates a cross-sectional view of the woven fabric band with a plurality of heating mechanisms being inserted into the woven fabric band according to one or more embodiments of the present disclosure.

FIG. 3 illustrates a cross-sectional view of the woven fabric band 100 with a plurality of heating mechanisms 300 being inserted into the woven fabric band 100 according to one or more embodiments of the present disclosure. In certain embodiments, the heating mechanisms 300 may be part of a mold. In other embodiments, the heating mechanisms 300 may be the actual mold (i.e., the portion of the woven fabric band 100 that comes into contact with the plurality of heating mechanisms 300 conforms to the shape of the plurality of heating mechanisms 300).

In certain embodiments, the mold enables the reflow of one or more ends of the woven fabric band 100 into three-dimensional shapes. The three-dimensional shapes may enable the woven fabric band 100 to be mechanically coupled to another object. For example, the heating mechanisms 300 may be used to create the distal end 120 and the through holes 110 of the woven fabric band 100 shown and described with respect to FIG. 1A and FIG. 1B.

In embodiments, each of the plurality of heating mechanisms 300 include a heating element 310 disposed on a distal end. The heating elements 310 may cause the heated portions of the woven fabric band 100 to conform to the shape of the heating elements 310 such as discussed above. Further, and as shown in FIG. 3, the heating elements 310 may be used to apply heat to a top side of the woven fabric band 100 and a bottom side of the woven fabric band 100 to create one or more through holes 110 (FIG. 1). Although the heating mechanisms 300 are shown on both sides of the woven fabric band 100, the heating mechanisms 300 may be used on either the top side or the bottom side of the woven fabric band 100.

In some cases, the heating mechanisms 300 include one or more overflow channels 320. The overflow channels are configured to enable the melted portions of the woven fabric band 100 to move away from the through holes 110 and the woven fabric band 100. Once the melted portions have been moved away from the woven fabric band 100, the melted material may be permanently removed from the woven fabric band 100 (e.g., by cutting the material).

Figure 4:
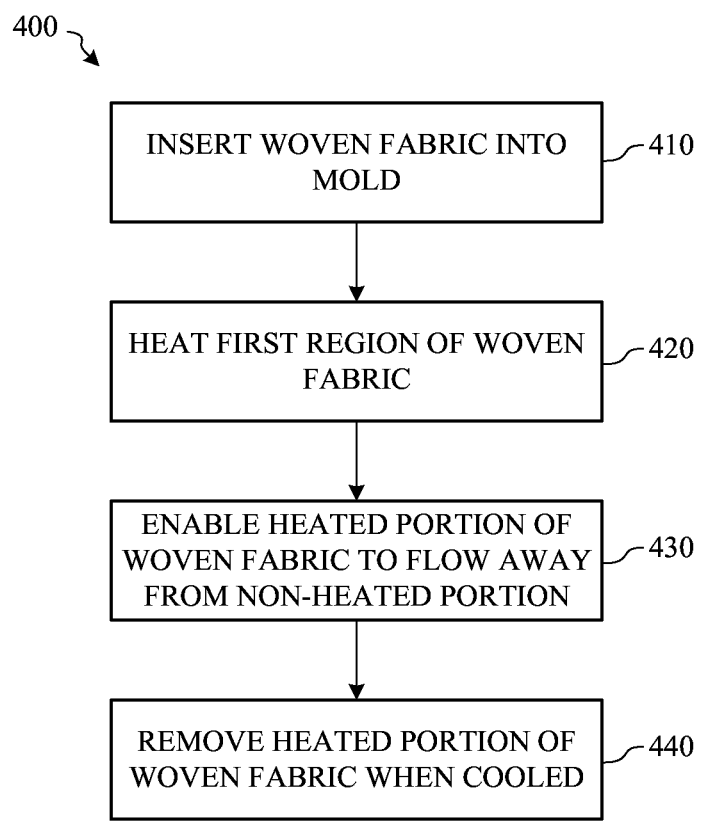
FIG. 4 is a flow diagram that illustrates a method for generating one or more securement features of the woven fabric band according to one or more embodiments of the present disclosure.

FIG. 4 is a flow diagram that illustrates a method 400 for generating one or more securement features of a woven fabric band according to one or more embodiments of the present disclosure. In certain embodiments, the method 400 may be used to generate one or more through holes, such as, for example, through holes 110 of the woven fabric band 100 shown and described above with respect to FIG. 1A and FIG. 1B. In addition, the method 400, or portions of the method 400, may be used to generate various ornamentations for the woven fabric band. Such ornamentations include a logo, a hole, a depression, a protrusion, a nub, a ridge, a link, a boss and the like.

Method 400 begins when the woven fabric band is inserted 410 into a mold. In certain embodiments, when inserted into the mold, the woven fabric band may have a generic shape and/or structure (e.g., it has not been subjected to a heating process). In other embodiments, the woven fabric band, or portions thereof, may have previously been subjected to a heating process that causes the woven fabric band (or portions thereof) to take a particular shape or structure. One exemplary structure is shown with respect to FIG. 1A and FIG. 1B.

Once the woven fabric band has been inserted into the mold, flow proceeds to operation 420 in which a first region of the woven fabric band is heated. The first region of the woven fabric band may be heated by one or more heating elements disposed on a distal end of a portion of the mold, such as, for example, heating mechanisms 300 and heating elements 310 shown in FIG. 3. The heating mechanisms may be configured in a particular shape or orientation. Thus, when the heating mechanisms come into contact with the woven fabric band, the portions of the woven fabric band that are heated conform to the shape of the mold and/or the heating mechanisms.

In certain embodiments, the mold may be comprised of many different heating elements that may be selectively activated in order to heat different portions of the woven fabric band. In another embodiment, the entire mold may be heated at the same time so as to enable the woven fabric band to take a desired shape or orientation. In still yet other embodiments, the heating mechanisms of the mold may be heated to the temperature melting point of the outer layer. Once the heating mechanisms have been heated to the temperature melting point, the heating mechanisms may be inserted into the woven fabric band to create one or more through holes.

As discussed above, the heating mechanisms may be used to heat and melt certain portions of the woven fabric band. As a result, the shape and structure of the heated portions of the woven fabric band may be changed while a non-heated portion retains its original shape and structure. In embodiments, the heating mechanisms are placed on a top side and a bottom side of the woven fabric band. As the heating mechanisms are inserted into the woven fabric band, each heating mechanism melts a portion of the outer layer and the inner layer of the woven fabric band.

The melting process may slightly shrink the heated portions of the woven fabric band. Thus, in order to achieve a thickness of about 1.4 mm, the woven fabric band may need to have an original thickness of 1.7 mm. In another embodiment, the heating and melting process may cause the heated portion (once cooled) to be stronger and/or more rigid than the un-melted portions of the woven fabric band. Thus, the melted portion of the woven fabric band may be better suited for use as a securement mechanism.

Referring back to FIG. 4, once a portion of the woven fabric band has been heated, flow proceeds to operation 430 and the heated or melted portions of the woven fabric band flow away from the non-heated or un-melted portions of the woven fabric band. In embodiments, reflow of the melted portions of the woven fabric band may be achieved using one or more flow channels disposed in, or associated with, the mold. In certain embodiments, the one or more flow channels may be integrated within the heating mechanisms such as shown above with respect to FIG. 3.

Flow then proceeds to operation 440 in which the heated or melted portions of the woven fabric band are removed (if necessary). In certain embodiments, the heated or melted portions of the woven fabric band may be removed from the woven fabric band when the heated or melted portions have cooled or are in the process of cooling. The heated or melted portions may be removed using a knife, scissors, a laser and the like.

Figure 5:
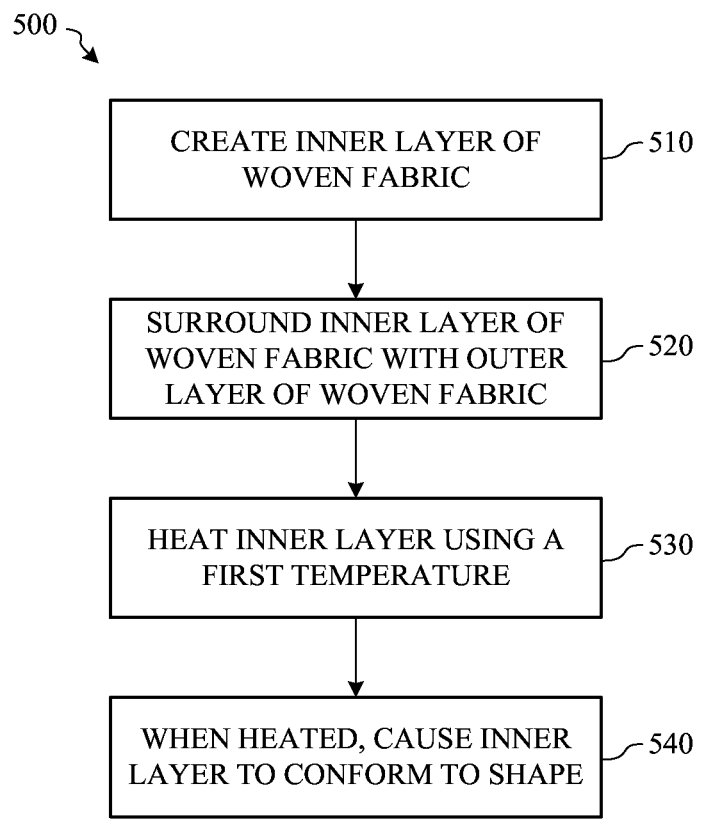
FIG. 5 is a flow diagram that illustrates a method for creating a woven fabric band according to one or more embodiments of the present disclosure.

FIG. 5 is a flow diagram that illustrates a method 500 for creating a woven fabric band according to one or more embodiments of the present disclosure. In certain embodiments, the method 500 may be used to create a woven fabric band such as shown above with respect to FIG. 1A, FIG. 1B and FIG. 2. As discussed above with respect to these figures, the method 500 may be used to create ornamental designs or shapes on the woven fabric band including holes, depressions, logos, ridges, bosses, links, protrusions and the like. The method 500 may also be used to generate a number of different three-dimensional shapes and configurations.

Method 500 begins at operation 510 in which an inner layer of a woven fabric is created. In certain embodiments, the inner layer may be the inner layer 220 described above with respect to FIG. 2. The inner layer may be a woven fabric that has a low temperature melting point (e.g., around 110 degrees Celsius). The inner layer may be configured to be malleable when heated which enables the inner layer to be formed into the different shapes and configuration described above. Further, when cooled (e.g., after the heating process) the inner layer may be formed or otherwise change from a malleable material into a rigid material that prevents the woven fabric band from stretching or losing its shape.

Flow then proceeds to operation 520 in which the inner layer is surrounded by an outer layer of woven fabric. In certain embodiments, the outer layer may be the outer layer 210 described above with respect to FIG. 2. The outer layer may be a woven fabric that has a higher temperature melting point than the inner layer. For example, the outer layer may have a temperature melting point of 220 degrees Celsius. The outer layer may be configured to conform to the shape of the inner layer as the inner layer is manipulated when heat is applied. Because the outer layer has a higher temperature melting point than the inner layer, the outer layer is not damaged (e.g., does not show any residual markings, defects and the like) caused by the heating process. Thus, the outer layer may keep its original colors, ornamentations and the like. In other embodiments, the heating process may cause a desired change in the texture, color, or shape of the outer layer.

Operation 530 provides that the inner layer is heated with a first temperature. As the outer layer surrounds the inner layer, one or more embodiments provide that the heat is applied to the inner layer through the outer layer. In such embodiments, the heat that is applied is hot enough to cause the inner layer to melt or become more malleable but is not hot enough to affect the outer layer. In certain embodiments, the heat may be applied when the woven fabric is in a mold or other such mechanism that causes the woven fabric to conform to a desired shape when heated. The heat may be applied locally to one or more portions of the inner layer or to the inner layer as a whole.

Once heat having a first temperature has been applied to the inner layer, flow proceeds to operation 540 and the inner layer is formed into a desired shape or orientation. In embodiments, the orientation or shape may be in conformity with a mold, a stencil or the like. As the inner layer conforms to the shape, the outer layer that surrounds the inner layer takes the same shape. Thus, a woven fabric band may be created having a desired shape while still maintaining desired aesthetics.

FIG. 6A-FIG. 6D illustrate an exemplary woven fabric band 600 having a plurality of threads 640 for securing an object 630 to the woven fabric band 600 according to one or more embodiments of the present disclosure. Although the term fabric is used herein, it is contemplated that the embodiments and methods described herein may be applied to various materials that can be woven together to form a strap, band, article of clothing and the like. It is contemplated that the material, when woven together, may be cut, manufactured or manipulated into various shapes, objects and designs. Non-limiting examples of the fabric may include nylon and other such polymers. In certain embodiments, the woven fabric, or portions thereof, may be heated to a point where the heated portion melts. When the woven fabric has melted, the melted portion may be manipulated or formed into various shapes, protrusions, graphics and the like. However, due to the nature of the construction of the woven material (e.g., an outer layer of the woven fabric being more heat resistant than an inner layer of the woven fabric), the inner layer may melt and take a desired shape while the outer layer does not melt but conforms to the shape of the inner layer while still maintaining its aesthetic properties (e.g., color, texture etc.).

As discussed above, in some embodiments a woven fabric band may be secured to an attachment mechanism or other object using various threads. In such embodiments, the threads may be part of the inner layer, the outer layer, or a combination thereof. In addition, the attachment mechanism discussed below may be placed on one end of the woven fabric band while the attachment mechanism discussed above with respect to FIG. 1A and FIG. 1B is attached to a different end of the woven fabric band.

Referring to FIG. 6A-FIG. 6D, a woven fabric band 600 may be a thin band and may be similar to the woven fabric band 100 described above. As such, the woven fabric band 600 may have one or more patterns, protrusions, depressions, rivets or designs displayed thereon.

As briefly discussed above, an object 630 may be secured to the woven fabric band 600. The object 630 may be a pin, a clasp, a hook or other such mechanism that enables an object 630 to be secured to a second object or to the woven fabric band 600 itself. The embodiments disclosed herein may be used in conjunction with a mobile phone, a device that tells time, a health monitoring device or assistant, a purse, a bracelet or other such article of clothing. Further, although a flat thin band is specifically shown and described herein, the woven fabric band 600 may be formed in any shape having a variety of dimensions. For example, if the woven fabric band 600 was to be used to as a strap for a purse, the woven fabric band 600 may be circular in shape.

In certain embodiments, the woven fabric band 600 has a distal end 610 from which a plurality of threads may be exposed. The plurality of threads may be exposed as part of the manufacturing process (e.g., deliberately exposed when the layers of the woven fabric band 600 are constructed) or may be exposed by cutting or tearing at least a portion of the woven fabric band 600. The woven fabric band 600 may have an inner layer and an outer layer such as described above. In such embodiments, the plurality of threads may be part of the inner layer of the woven fabric band 600, the outer layer of the woven fabric band or a combination thereof.

Figure 6A:
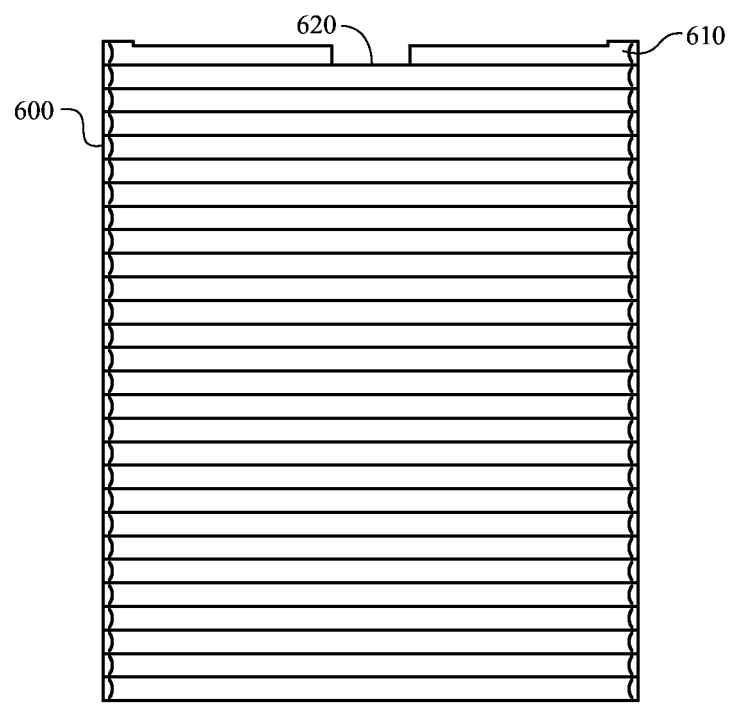
FIG. 6A illustrates an exemplary woven fabric band according to one or more embodiments of the present disclosure.

As shown in FIG. 6A, the distal end 610 of the woven fabric band 600 may also have an alignment slot 620. The alignment slot 620 may be used to align an object with the woven fabric band 600. In embodiments where the object to be coupled to the woven fabric band 600 is a hook or a clasp, the alignment slot 620 may be formed in a shape that corresponds to the object. The slot may also be used to enable the object, or a portion of the object, to rotate about an axis.

That is, the alignment slot 620 may be a space or a cutout in the woven fabric band 600 that will not hinder movement of an object or a portion of the object from a first position to a second position. Although a rectangular alignment slot 620 is specifically shown in the figures, it is contemplated that the alignment slot 620 may be placed in any position on the woven fabric band 600 and have a variety of configurations. For example, the alignment slot 620 may be circular, square or other such shape.

Figure 6B:
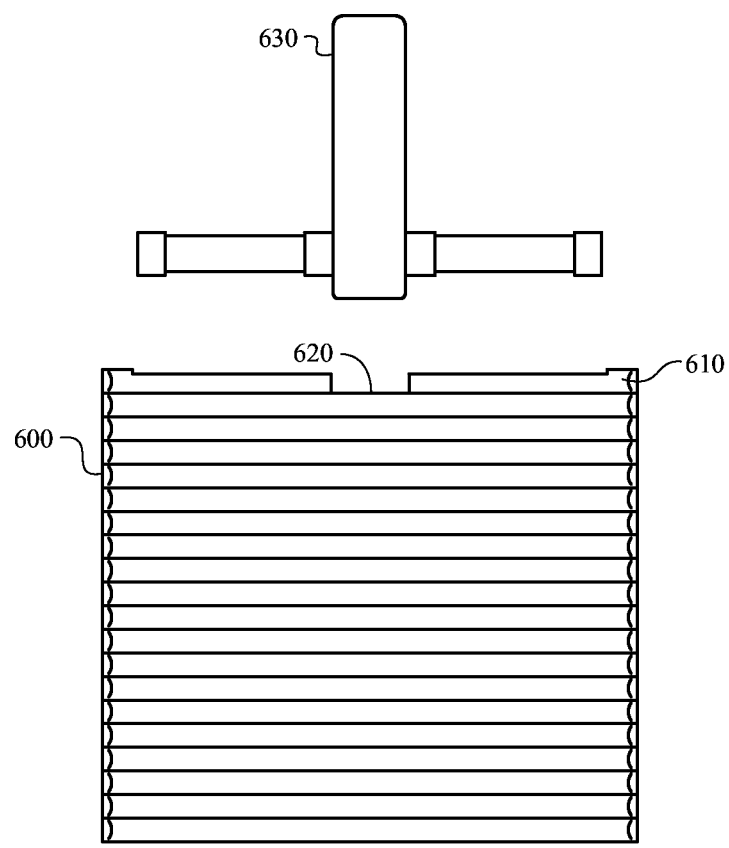
FIG. 6B illustrates an object that is to be coupled to the woven fabric band according to one or more embodiments of the present disclosure.

FIG. 6B illustrates an object 630 that is aligned with the woven fabric band 600 and the alignment slot 620 according to one or more embodiments of the present disclosure. In certain embodiments, to assist with the alignment, the woven fabric band 600 and the object 630 may be placed in a mold (not shown). As shown in FIG. 6B, the distal end 610 of the woven fabric band 600 may be formed, cut or otherwise manipulated to mirror a general shape of the object 630.

In some embodiments, a plurality of threads may be exposed from the distal end 610 of the woven fabric band 600. In such embodiments, the plurality of threads may be at least partially aligned with the object 630. Thus, as the woven fabric band 600 is cut, formed or otherwise manipulated into a desired shape, the plurality of threads may be exposed. Although a specific object 630 is shown, it is contemplated that the object 630 may be any number of securement mechanisms used to secure the woven fabric band 600 to another object. Non-limiting examples include clasps, hooks, and other such fasteners.

Figure 6C:
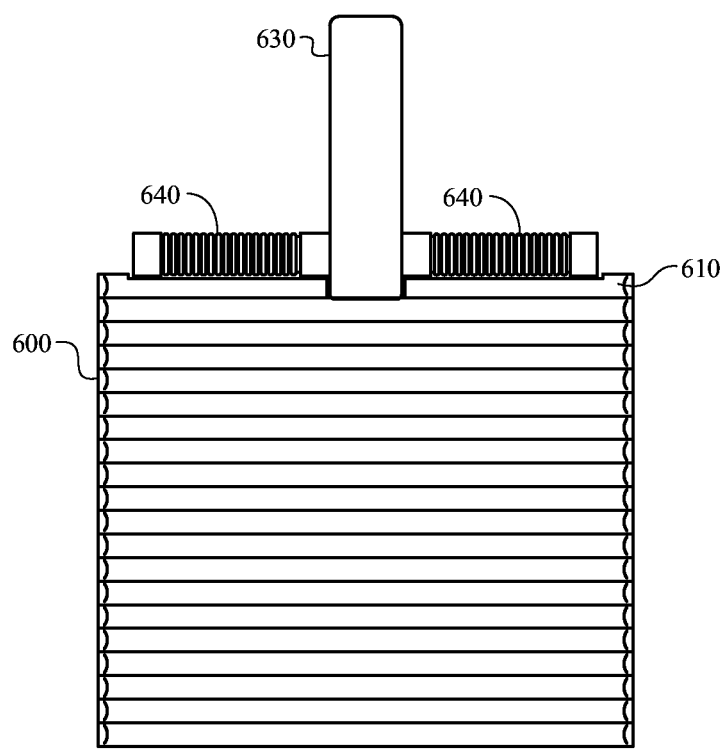
FIG. 6C illustrates a woven fabric band that is coupled to an object using a plurality of threads according to one or more embodiments of the present disclosure.

FIG. 6C illustrates a woven fabric band 600 that is coupled to an object 630. As shown in FIG. 6C, the object 630 is coupled to the woven fabric band 600 using a plurality of threads 640. As also shown in FIG. 6C, the woven fabric band 600 may be structured in such a way as to enable the object 630 to be flush or substantially flush against the distal end 610 of the woven fabric band 600. When the object 630 is positioned at the distal end 610 of the woven fabric band 600, the plurality of threads 640 may be wound, stitched or otherwise placed around at least a portion of the object 630 to secure the object 630 to the distal end 610 of the woven fabric band 600. The stitching process may be performed by hand or by a machine.

Figure 6D:
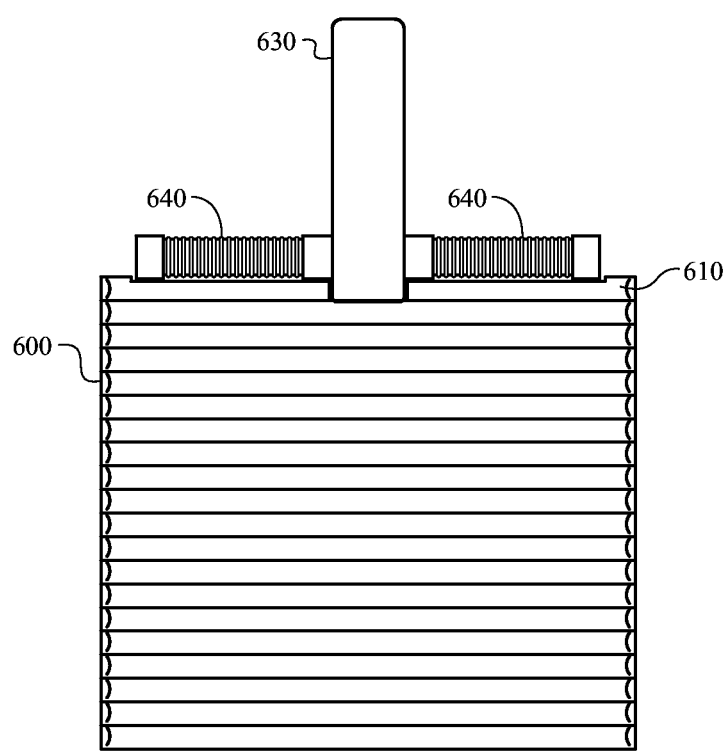
FIG. 6D illustrates a woven fabric band that is coupled to an object using a plurality of threads that have been subjected to a heating process according to one or more embodiments of the present disclosure.

FIG. 6D illustrates a woven fabric band 600 that is coupled to an object 630 using a plurality of threads 640. However, in the embodiment illustrated in FIG. 6D, the plurality of threads 640 have been subjected to a heating process. The heating process subjects the plurality of threads to a reflow process which subsequently causes the plurality of threads 640 to increase in tensile strength. The reflow process may also decreases the overall width (or other dimension) of one or more threads in the plurality of threads 640.

For example, when comparing the plurality of threads 640 of FIG. 6C to the plurality of threads 640 of FIG. 6D, the plurality of threads 640 in FIG. 6D have a smaller diameter. The smaller diameter may enable the object 630 to be securely coupled to the woven fabric band 600. In addition, a second object (not shown) may be coupled to the object 630 to provide additional functionality to the object 630 and also to hide the plurality of threads 640 from view. In embodiments, the second object may be a clasp or other attachment mechanism that interacts with the object 630.

As with the woven fabric band 100 described above, the woven fabric band 600 comprises an inner layer and an outer layer. The outer layer of the woven fabric band 600 may have a first temperature melting point while the inner layer may have a second temperature melting point that is lower than the first temperature melting point. As the plurality of threads 640 are part of the inner layer, the plurality of threads 640 also have the first temperature melting point. Thus, when the woven fabric band is exposed to a heating process having a temperature equivalent to the first temperature melting point, the plurality of threads 640 undergo the reflow process while the outer layer remains unchanged.

Figure 7:
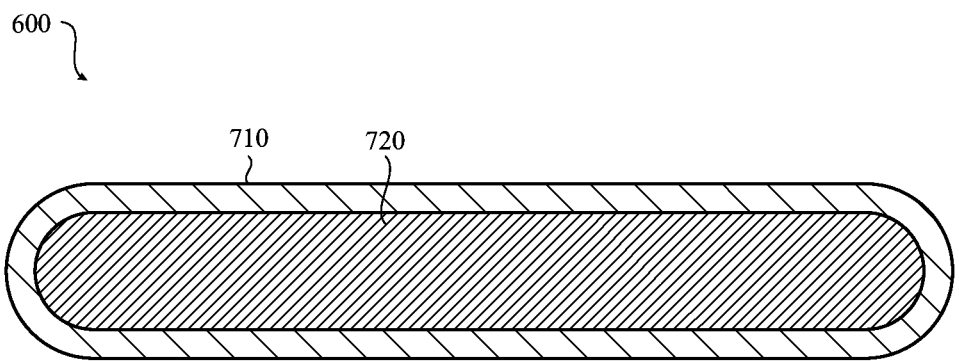
FIG. 7 illustrates a cross-sectional view of a woven fabric band according to one or more embodiments of the present disclosure.

FIG. 7 illustrates a cross-sectional view of a woven fabric band 600 according to one or more embodiments of the present disclosure. As shown in FIG. 7, the woven fabric band 600 is comprised of an outer layer 710 and an inner layer 720. In certain embodiments, the outer layer 710 may be woven material of a first type and the inner layer 720 may be a woven material of a second, different type. In other embodiments, the outer layer 710 and the inner layer 720 may be the same type of woven material but have different temperatures melting points. For example, the temperature melting point of the outer layer 710 may be 220 degrees Celsius while the temperature melting point of the inner layer 720 may be 110 degrees Celsius. In still yet other embodiments, the outer layer 710 may be made of a first material and have a first temperature melting point (e.g., 220 degrees Celsius) and the inner layer 720 may be made of a second material and have a second temperature melting point (e.g., 110 degrees Celsius).

In certain embodiments, the outer layer 710 may be a sheath that has a cross-hatch configuration. In such embodiments, the inner layer 720 may be comprised of another material or fiber. As shown in FIG. 7, the outer layer 710 may surround the inner layer 720. It is also contemplated that the outer layer 710 may be configured to removably slide over the inner layer 720 prior to applying the heating process to a distal end of the woven fabric band 600.

As discussed above, one or more embodiments provide that the inner layer 720 has a lower temperature melting point than the outer layer 710. As a result, when heat is applied to the woven fabric band 600, the inner layer 720 may melt or become more malleable. As such, the inner layer 720 may be manipulated (e.g., using a mold or other such form factor mechanism) to take a desired form or shape. As the inner layer 720 melts and is manipulated into a new shape, one or more embodiments provide that the outer layer 710 conforms to the new shape of the inner layer 720. However, because the outer layer 710 has a higher temperature melting point than the inner layer 720, the outer layer 710 does not melt and may keep its original aesthetic look (i.e., the outer layer 710 is not damaged due to the melting process).

The process described above enables the inner layer 720 to take a variety of shapes and forms including, but not limited to three-dimensional shapes, logos, holes, protrusions, nubs, ridges, depressions, links, bosses and the like. As the inner layer 720 takes these various forms, the outer layer 710 conforms to the new shape of the inner layer 720. In some embodiments, the outer layer 710 is flexible but durable. As such, the outer layer 710 may maintain its original aesthetic values.

As discussed above, a first portion of the woven fabric band 600 may be subjected to the heating process while a second, different portion of the woven fabric band 600 is not subjected to the heating process. For example, a plurality of threads may be placed on different portions of the woven fabric band 600 and then subjected to the heating process. The placement of the threads in this manner may enable a designer to create a number of different aesthetic looks for the woven fabric band 600. For example, threads may be placed on the outer layer of the woven fabric band 600 in various configurations and designs. The individual threads or collections of threads may be subjected to a heating process which would cause the threads to melt and subsequently harden in the desired design or configuration.

Figure 8:
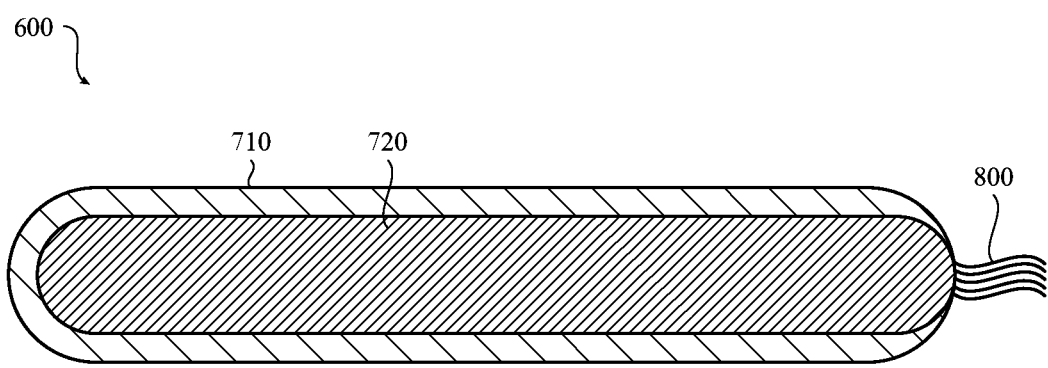
FIG. 8 illustrates a cross-sectional view of the woven fabric band with a plurality of threads extending therefrom according to one or more embodiments of the present disclosure.

FIG. 8 illustrates a cross-sectional view of the woven fabric band 600 with a plurality threads 800 extending therefrom according to one or more embodiments of the present disclosure. In certain embodiments, the plurality of threads 800 may be similar to the plurality of threads 640 (FIG. 6C). The plurality of threads 800 may be part of the inner layer 720 of the woven fabric band 600, an outer layer 710 of the woven fabric band or a combination thereof. In embodiments, the plurality of threads 800 may be exposed on a distal end of the woven fabric band 600 when a portion of the woven fabric band 600 is cut or otherwise manipulated into a desired shape or orientation.

Although a plurality of threads are specifically shown and described herein, it is contemplated that a long thread may be used to secure an object to the woven fabric band 600. For example, a long thread may be interwoven with the woven fabric band 600. In such embodiments, the long thread may have a length greater (e.g., two times greater) than a length of the woven fabric band 600. A portion of the long thread may extend from the woven fabric band and be used to secure the object to a distal end or other area of the woven fabric band 600.

In such embodiments, the long thread may have a temperature melting point that is lower than the rest of the woven fabric band 600. Thus, when the heating process is applied, the long thread is the only material that is affected. In embodiments where the long thread is implemented, it is contemplated that the woven fabric band 600 may be comprised of a single layer. Although a singular long thread was used in the example above, it is contemplated that two or more long threads may be used to secure an object to the woven fabric band 600 such as described above.

Once the plurality of threads 800 have been exposed, the woven fabric band may be placed in a mold (not shown). The mold may be configured to receive an object, such as, for example, object 630 (FIG. 6C) or object 150 (FIG. 1B) that is to be coupled to the woven fabric band 600. Once the woven fabric band 600 and the object 630 have been placed in the mold, the object 630 may be aligned with the woven fabric band in a desired orientation. The plurality of threads 800 may then be wrapped around at least a portion of the object 630. A heating mechanism may then be used to melt the plurality of threads 800 surrounding the object.

In certain embodiments, the heating mechanism may be part of the mold. Thus, when the woven fabric band 600 and the object 630 are placed in the mold, the heating mechanism may be activated and cause the plurality of threads to reflow around the object 630. In other embodiments, the heating mechanism may be part of the object 630. In yet another embodiment, the object 630 may be pre-heated to a temperature that is equivalent to or greater than the temperature melting point of the plurality of threads 800. Thus, as the plurality of threads 800 are wrapped around the object 630, the reflow process may begin.

When a mold is used, the mold and/or the heating mechanism may include one or more overflow channels (not shown). In embodiments, the overflow channels are configured to enable the melted portions of the woven fabric band 600 to flow away from the woven fabric band 600. Once the melted portions have moved away from the woven fabric band 600, the melted material may be permanently removed (e.g., by cutting the melted material) and discarded.

Figure 9:
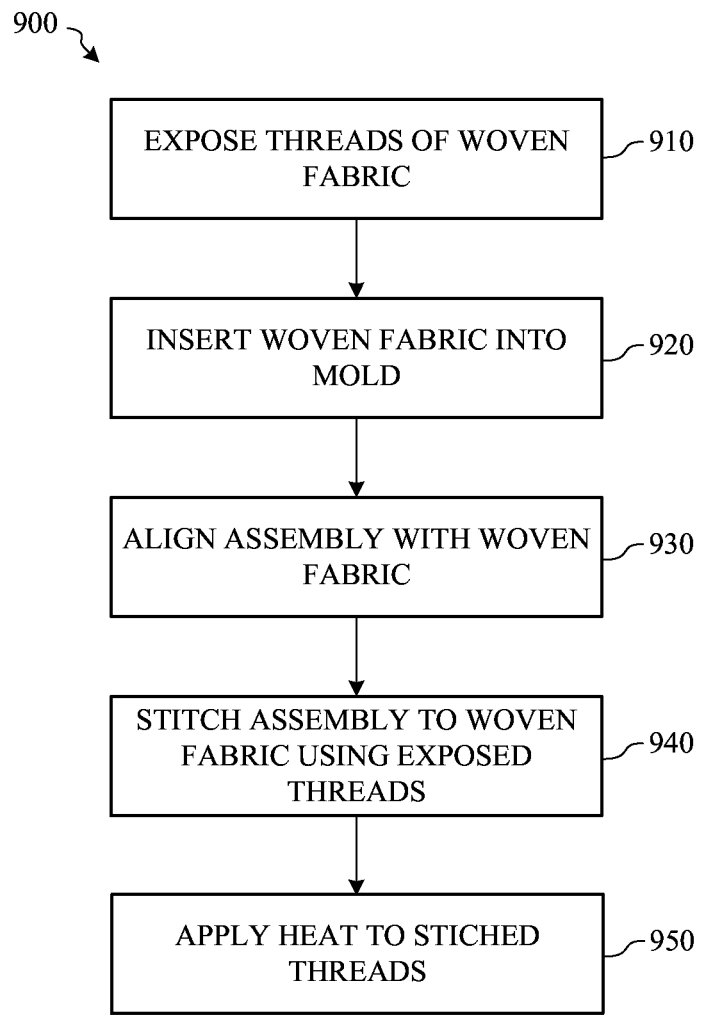
FIG. 9 is a flow diagram that illustrates a method for securing an object to a woven fabric band according to one or more embodiments of the present disclosure.

FIG. 9 is a flow diagram that illustrates a method 900 for securing an object to a woven fabric band according to one or more embodiments of the present disclosure. In certain embodiments, the method 900 may be used to secure an object, such as, for example, object 630 (FIG. 6B) to a woven fabric band, such as, for example woven fabric band 600 (FIG. 6A). In certain embodiments, the woven fabric band may have multiple layers as shown and described above with reference to FIG. 7.

Method 900 begins when a plurality of threads of the woven fabric band are exposed 910. In certain embodiments, the plurality of threads may be exposed by cutting, scarring, tearing, or machining at least a part of the woven fabric band. For example, it is contemplated that a woven fabric band may cut into smaller sub-bands. As a result of the woven fabric band being cut, the ends of the smaller sub-band may begin to fray, thereby exposing a plurality of threads. It is also contemplated that the inner layer of the woven fabric band may be manufactured to have a one or more threads extending therefrom.

Once the plurality of threads have been exposed, flow proceeds to operation 920 in which the woven fabric band is inserted into a mold. In certain embodiments, the mold may be configured to heat a region of the woven fabric band in order to cause the woven fabric band to take a particular shape.

Flow then proceeds to operation 930 and an object that is to be coupled to the woven fabric band is aligned with the woven fabric band. As briefly discussed above, the object may be placed in the mold along with the woven fabric band to help ensure that the alignment between the object and the woven fabric band is correct or that the object is in a desired orientation with respect to the woven fabric band.

Once the alignment has been verified, flow proceeds to operation 940 and the object is coupled to the woven fabric band. In certain embodiments, the plurality of exposed threads are used to stitch or otherwise secure the object to the woven fabric band (e.g., a distal end of the woven fabric band). It is contemplated that the stitching may be done by a machine or by hand.

Following the stitching process, flow proceeds to operation 950 in which heat is applied to the stitched plurality of threads. In certain embodiments, the plurality of threads are heated by one or more heating elements disposed in or on the mold. In embodiments where heating elements are disposed in or on the mold, the heating elements may be placed at various portions within the mold. As such, each heating element may be selectively activated in order to heat different portions of the woven fabric band. In some embodiments, the heating mechanisms may be placed on a top side and a bottom side of the mold. This may help ensure that the distal end of the woven fabric band (and the threads that are exposed from the distal end of the woven fabric band) are thoroughly exposed to the heating process.

In certain embodiments, the heating process may cause the thickness or the diameter of the plurality of threads to shrink. In another embodiment, the heating, melting and subsequent cooling process may cause the heated portion (once cooled) to be stronger and/or more rigid than the un-melted portions of the woven fabric band. Thus, the melted portion of the woven fabric band may be better suited to secure the object to the woven fabric band.

The description and illustration of one or more embodiments provided in this disclosure are not intended to limit or restrict the scope of the present disclosure as claimed. The embodiments, examples, and details provided in this disclosure are considered sufficient to convey possession and enable others to make and use the best mode of the claimed embodiments. Additionally, the claimed embodiments should not be construed as being limited to any embodiment, example, or detail provided above. Regardless of whether shown and described in combination or separately, the various features, including structural features and methodological features, are intended to be selectively included or omitted to produce an embodiment with a particular set of features. Having been provided with the description and illustration of the present application, one skilled in the art may envision variations, modifications, and alternate embodiments falling within the spirit of the broader aspects of the embodiments described herein that do not depart from the broader scope of the claimed embodiments.

We claim:
1. A band assembly comprising:
   a woven band comprising:
      an inner layer of first woven fabric threads having a first temperature melting point;
      an outer layer of second woven fabric threads having a second temperature melting point that is higher than the first temperature melting point, wherein the outer layer forms a sheath that surrounds the inner layer on opposing sides of the inner layer; and first holes extending through the inner layer and the outer layer of the woven band;

wherein when heat having a first temperature is applied to the woven band, the inner layer conforms to a first shape;

wherein when the inner layer conforms to the first shape, the outer layer is configured to conform to a second shape, wherein the second shape is a shape of the inner layer;

an attachment mechanism having an end of the woven band within the attachment mechanism and having second holes that are overlapping the first holes; and interlock mechanisms each extending through both of a corresponding one of the first holes and a corresponding one of the second holes to secure the attachment mechanism to the woven band, the interlock mechanisms each comprising a first portion extending from a first side of the attachment mechanism and a second portion extending from a second side of the attachment mechanism, opposite the first side, the first portion being received by the second portion.

2. The band assembly of claim 1, wherein when heat is applied to the woven band, the outer layer is not damaged.

3. The band assembly of claim 1, wherein the first temperature melting point is about 110 degrees Celsius.

4. The band assembly of claim 1, wherein the second temperature melting point is about 220 degrees Celsius.

5. The band assembly of claim 1, wherein a first portion of the woven band is heated to cause the inner layer at the first portion to conform to the first shape without heating a second portion of the woven band.

6. The band assembly of claim 1, wherein the first shape is a logo.

7. The band assembly of claim 1, wherein the first shape is selected from a group comprising a hole, a protrusion, a nub, a ridge, a link and a boss.

8. The band assembly of claim 1, wherein the first shape is associated with a mold.

9. A band for a device that tells time, the band comprising:
a woven portion comprising:
an inner layer of first woven fabric threads having a first temperature melting point;
an outer layer of second woven fabric threads having a second temperature melting point that is higher than the first temperature melting point, wherein the outer layer extends about a periphery of the inner layer; and
first holes extending through the inner layer and the outer layer of the woven portion;
an attachment mechanism having an end of the woven portion within the attachment mechanism and having second holes that are overlapping the first holes; and
interlock mechanisms each extending through both of a corresponding one of the first holes and a corresponding one of the second holes to secure the attachment mechanism to the woven portion, the interlock mechanisms each comprising a first portion extending from a first side of the attachment mechanism and a second portion extending from a second side of the attachment mechanism, opposite the first side, the first portion being received by the second portion.

10. The band of claim 1, wherein the first temperature melting point is about 110 degrees Celsius.

11. The band of claim 1, wherein the second temperature melting point is about 220 degrees Celsius.

12. The band of claim 1, wherein a first portion of the woven portion is heated to cause the inner layer at the first portion to conform to a shape without heating a second portion of the woven portion.

13. The band of claim 12, wherein the shape is selected from a group comprising a hole, a protrusion, a nub, a ridge, a link and a boss.

14. The band of claim 12, wherein the shape is associated with a mold.

* * * * *